(No Model.)
W. DUNBAR.
LUMBER TRIMMER.
No. 404,267. Patented May 28, 1889.
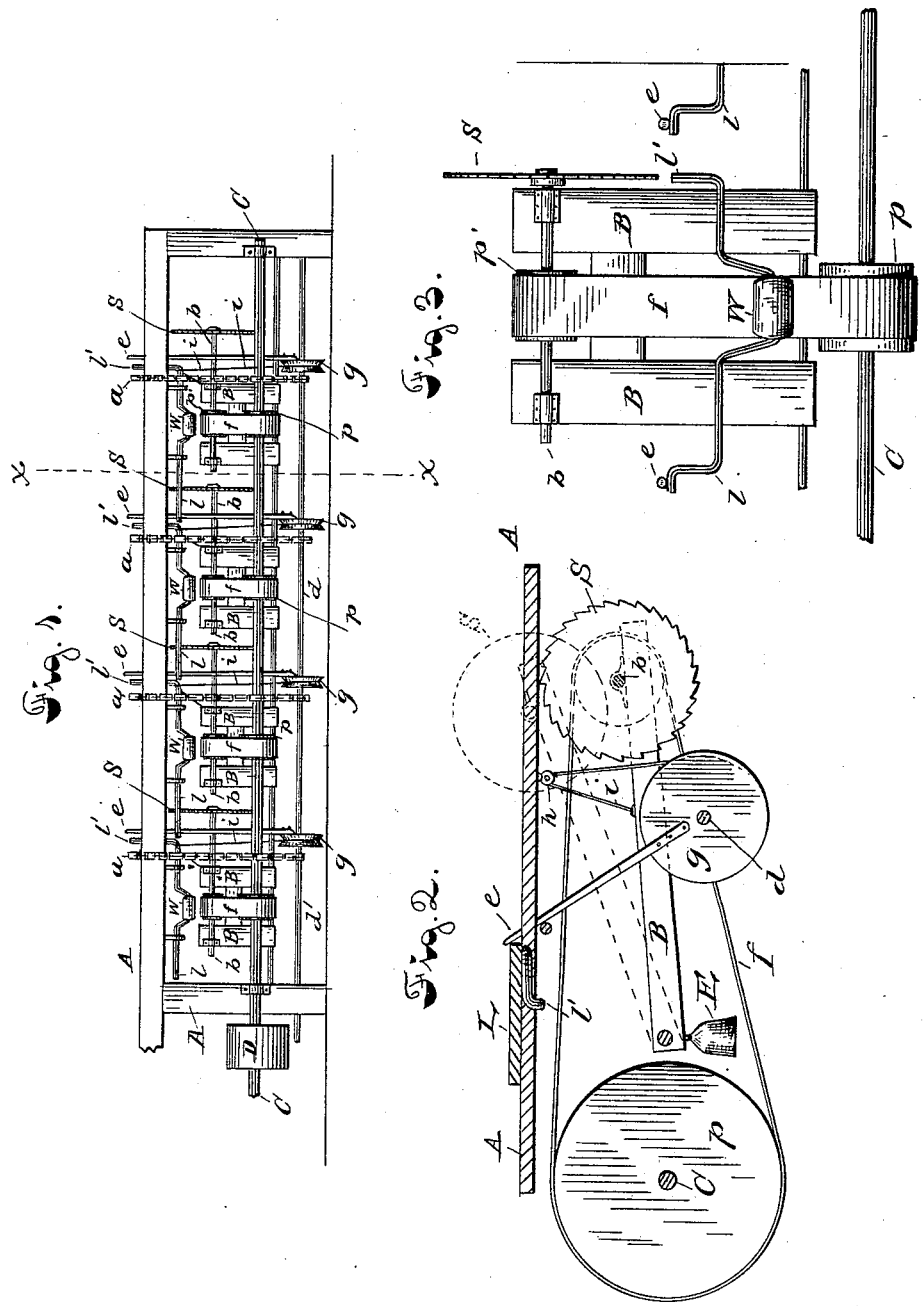
Witnesses
H. D. Nealy.
C. P. Bailey.
Inventor,
William Dunbar.
By his Attorney
J. R. Drake.

UNITED STATES PATENT OFFICE.

WILLIAM DUNBAR, OF LARRABEE, PENNSYLVANIA, ASSIGNOR OF ONE-HALF TO JUDSON J. NEWMAN, OF BUFFALO, NEW YORK.

LUMBER-TRIMMER.

SPECIFICATION forming part of Letters Patent No. 404,267, dated May 28, 1889.

Application filed January 19, 1889. Serial No. 296,813. (No model.)

*To all whom it may concern:*

Be it known that I, WILLIAM DUNBAR, a citizen of the United States, residing at Larrabee, in the county of McKean and State of Pennsylvania, have invented certain new and useful Improvements in Lumber-Trimmers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to trim the ends of lumber automatically without the use of foot or hand levers, the length of the stick set on the table regulating the action or "tripping" of the saw required to cut the ends, and also holding down all intermediate saws, the saw at the operator's end trimming that end, as usual; and the invention as constructed and applied will be understood by reference to the following specification and claim.

In the drawings, Figure 1 is a side elevation of the whole device, showing four saws only; Fig. 2, an end elevation through line $xx$, Fig. 1, showing one saw and arbor enlarged, and the devices for raising and lowering it, the table and lumber thereon in section; Fig. 3, an enlarged detail, being a top view of one arbor, showing levers, saw, &c., all removed from the table.

A represents the usual table, showing four saws two feet apart; but as many as desired can be used in a larger machine.

$a\ a\ a$ are the chains, which carry the lumber in the usual way.

B represents a swinging saw-frame; S, the saws; $b$, arbor saw-shaft; C, the main shaft outside of table, and D the main belt-pulley, which runs the pulleys $p\ p$ on main shaft, and by belts $f f$ around saw-pulleys $p'\ p'$ runs the saws.

$d$, Figs. 1 and 2, is the lever-shaft, having grooved pulleys $g\ g$ fastened thereon, to the side of which is attached a lever, $e$, which raises and lowers the arbor, the top standing up above the table, as shown in Figs. 1 and 2.

To the swinging saw-frame B is fastened a cord, $i$, which runs up through a small wheel on the under side of the table A and down around grooved pulley $g$, in which it is fastened at its other end. By this means, when a board, L, strikes the top of lever $e$, it pushes it forward, raising the saw S, as shown in dotted lines, Fig. 2, and trims that end of the board according to its length. The board having passed, the saw drops to its normal position by means of the counter-balance E, and so on with each and all.

The automatic devices for dropping the intermediate saws, so that only the one nearest the end of the board placed on the table will work, are as follows: Across and above each saw-frame extends a bent and weighted rod, W, hanging from the under side of the table A. (See Fig. 1.) It is weighted in the middle, so as to drop it to its normal position when required. One end is bent upright with a lever, $l'$, and stands up above the table A about opposite the end of saw-lever $e$ and in front of it. (See Fig. 1.) The other end, $l$, is bent outward into a crank shape. Below the table and against it rests the next saw-lever $l'$. (See Figs. 1 and 3.) The end of lever $l'$, which is the lever first struck by the side of the timber L, is pushed forward so that it lies down in position shown in Fig. 2. This, of course, drops its other or crank end backward and downward, and carries with it the saw-lever $e$, resting against it below the level of the table, so that the forward moving of the lumber has no effect on it, and it therefore cannot raise its saw; but the extreme end of the lumber (whose front edge has caused the dropping of all the intermediate saw-levers, as just explained) does not quite reach the next saw-lever $e$ beyond, but is just long enough to strike a lever, $e$, which is, say, the one raising the fourteen-foot saw, carries that lever forward, raises the arbor and saw, as shown in dotted lines, Fig. 2, and trims the end. The moment this saw has done its work and the stick of lumber passed the weighted rod W drops into its former position, raising the lever end $l'$ and the crank end $l$, the latter also raising upright the saw-lever $e$, that is resting against it, all ready for the next stick, which, if shorter, will operate the saw below the twelve foot; if longer, the sixteen foot, they all working precisely as described—that is, if the stick is not long enough to strike the fourteen-foot lever $e$ it will only strike the twelve-foot lever and raises that saw, and so on through all. This trimmer cuts from two feet to twenty-four feet lumber, more or less, according to length of table and number of saws used.

I claim—

In a lumber-trimmer, in combination with a table, A, swinging saw-frame B, and saws S, operated by shafts C $b$, pulleys $p$ $p'$, belts $f$, levers $e$, pulleys $g$, shaft $d$, and cord $i$, the bent and weighted rod W, hung below the table A, one end bent into an upright lever, $l'$, and the other bent into a crank, $l$, against which latter rests the arbor-lever $e$, which prevents the action of its saw by dropping it backward below the table when the opposite end, $l'$, is pushed forward, all as fully hereinbefore explained.

In testimony whereof I affix my signature in presence of two witnesses.

WILLIAM DUNBAR.

Witnesses:
  J. R. DRAKE,
  GEO. A. BURNETT.